(12) United States Patent
Allais et al.

(10) Patent No.: US 10,177,468 B2
(45) Date of Patent: Jan. 8, 2019

(54) HEAT-SHRINKABLE PROTECTIVE ELEMENT

(71) Applicant: NEXANS, Paris (FR)

(72) Inventors: Arnaud Allais, Limas (FR); Anthony Combessis, Marseilles (FR); Lionel Flandin, Peisey-Nancroix (FR); Melek Maugin, Chassagny (FR); Mathieu Badard, Crolles (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 14/950,442

(22) Filed: Nov. 24, 2015

(65) Prior Publication Data

US 2017/0149151 A1    May 25, 2017

(30) Foreign Application Priority Data

Nov. 26, 2014   (FR) .................... 14 61499

(51) Int. Cl.
| | |
|---|---|
| *H01R 4/72* | (2006.01) |
| *H02G 15/18* | (2006.01) |
| *H02G 1/14* | (2006.01) |
| *H01R 43/00* | (2006.01) |
| *H01B 3/00* | (2006.01) |
| *C08K 3/04* | (2006.01) |
| *H02G 15/184* | (2006.01) |

(52) U.S. Cl.
CPC ............. *H01R 4/726* (2013.01); *H01B 3/004* (2013.01); *H01R 43/005* (2013.01); *H02G 1/14* (2013.01); *H02G 15/1806* (2013.01); *C08K 3/04* (2013.01); *C08K 3/041* (2017.05); *C08K 3/042* (2017.05); *C08K 3/045* (2017.05); *C08K 2201/001* (2013.01); *C08K 2201/006* (2013.01); *C08K 2201/011* (2013.01); *C08K 2201/016* (2013.01); *H02G 15/184* (2013.01)

(58) Field of Classification Search
CPC ........ H01R 4/726; H01R 4/72; H01R 43/005; H01B 3/004; H02G 1/14; H02G 15/1806
See application file for complete search history.

(56) References Cited

U.S. PATENT DOCUMENTS

| | | | | |
|---|---|---|---|---|
| 4,634,615 | A | * | 1/1987 | Versteegh ........... B29C 61/0616 138/141 |
| 4,791,016 | A | | 12/1988 | Schulte et al. |
| 4,876,033 | A | * | 10/1989 | Dziurla .................... C08K 3/04 252/511 |
| 2011/0017509 | A1 | | 1/2011 | Galletti |

(Continued)

FOREIGN PATENT DOCUMENTS

| | | |
|---|---|---|
| EP | 0157650 | 10/1985 |
| EP | 2747227 | 6/2014 |
| EP | 2784787 | 10/2014 |

OTHER PUBLICATIONS

Search Report dated 2015.

*Primary Examiner* — Timothy Thompson
*Assistant Examiner* — Amol Patel
(74) *Attorney, Agent, or Firm* — Sofer & Haroun, LLP

(57) ABSTRACT

A heat-shrinkable protective element having at least one protective layer is obtained from a polymeric composition having a polymer material, where the polymeric composition additionally has an electrically conducting filler having a BET specific surface of at least 100 $m^2/g$ according to Standard ASTM D 6556.

14 Claims, 2 Drawing Sheets

(56) References Cited

U.S. PATENT DOCUMENTS

| | | | |
|---|---|---|---|
| 2013/0240241 A1* | 9/2013 | Dubrow | H01B 3/004 174/113 R |
| 2014/0246220 A1 | 9/2014 | Allais et al. | |

* cited by examiner

HEAT-SHRINKABLE PROTECTIVE ELEMENT

RELATED APPLICATION

This application claims priority to French Patent Application No. 14 61499, filed on Nov. 26, 2014, the entirety of which is incorporated by reference.

BACKGROUND

Field of the Invention

The present invention relates to a heat-shrinkable protective element and to its process of manufacture.

It applies typically but not exclusively to the fields of low-voltage (in particular of less than 6 kV), medium-voltage (in particular from 6 to 45-60 kV) or high-voltage (in particular greater than 60 kV and which can range up to 800 kV) energy cables and fittings, whether direct current or alternating current.

Description of Related Art

A heat-shrinkable protective element may be conventionally called "heatshrink" or "heat-shrink sleeve" in the field of cable manufacture.

A heatshrink is a sheath which shrinks in the radial direction with respect to the longitudinal axis of the cable, when it is heated above a certain temperature. Typically, the volume of the material constituting the heatshrink remains constant between the shrinkable or nonshrunken state and the shrunken state: the thickness of the shrunken sheath is thus greater than the thickness of the nonshrunken sheath. The degree of shrinkage of a heat shrink can be between 100 and 600%, the degree of shrinkage being the ratio of the internal diameter of the sheath in the nonshrunken state to the internal diameter of the sheath in the shrunken state (obtained after heat treatment).

As such, it is difficult to manufacture a heat-shrinkable protective element having electrical insulating properties, which becomes semiconducting in the shrunken state subsequent to its heat treatment, while guaranteeing good mechanical properties once the protective element has shrunk.

OBJECTS AND SUMMARY

The aim of the present invention is to overcome the disadvantages of the techniques of the prior art by providing a heat-shrinkable protective element, intended to be used around a cable, exhibiting semiconducting properties and also good mechanical properties once the element has shrunk.

A subject-matter of the present invention is a heat-shrinkable protective element comprising at least one protective layer obtained from a polymeric composition comprising a polymer material, characterized in that the polymeric composition additionally comprises an electrically conducting filler having a BET specific surface of at least 100 m$^2$/g and preferably of at least 200 m$^2$/g according to Standard ASTM D 6556 (2014). The electrically conducting filler can have a BET specific surface of at most 2000 m$^2$/g and preferably of at most 1000 m$^2$/g.

In the present invention, Standard ASTM D 6556 (2014) corresponds to Standard ASTM D 6556-14.

More particularly, the heat-shrinkable protective element comprises a protective layer which is a polymeric layer charged with an electrically conducting filler having a BET specific surface of at least 100 m$^2$/g and preferably of at least 200 m/g, according to Standard ASTM D 6556 (2014). The electrically conducting filler can have a BET specific surface of at most 2000 m$^2$/g and preferably of at most 1000 m$^2$/g.

By virtue of the invention, the heat-shrinkable protective element advantageously makes it possible to obtain an element, the control of the quality of positioning of which can easily be carried out by a simple electrical conductivity test well known to a person skilled in the art. In addition, the heat-shrinkable protective element advantageously exhibits a very low electrical conductivity (i.e., electrically insulating) as long as the shrinkage thereof has not been carried out.

The Electrically Conducting Filler

The electrically conducting filler of the invention is preferably a carbon-based filler.

The term "carbon-based filler" is understood to mean any particle, or mixture of particles, predominantly composed of carbon atoms, which particles are or are not functionalized and are or are not grafted. The conducting carbon-based filler exhibits electrically conducting properties.

By way of examples, the conducting carbon-based filler can be chosen from carbon blacks, carbon fibers, graphites, graphenes, fullerenes, carbon nanotubes and one of their mixtures.

The electrically conducting filler of the invention is preferably a nanoparticle.

The nanoparticles typically have at least one of their dimensions of nanometric size (10$^{-9}$ meter).

The term "dimension" is understood to mean the number-average dimension of the combined nanoparticles of a given population, this dimension being conventionally determined by methods well known to a person skilled in the art.

The dimension of the nanoparticles of the invention can be, for example, determined by microscopy, in particular by transmission electron microscopy (TEM).

The number-average dimension of the nanoparticles can in particular be at most 400 nm, preferably at most 300 nm and more preferably at most 100 nm.

Particularly preferably, the number-average dimension of the nanoparticles is at least 1 nm and at most 100 nm, preferably at least 1 nm and at most 50 nm and particularly preferably at least 1 nm and at most 3 nm.

In a particularly preferred embodiment, the electrically conducting filler of the invention has an aspect ratio of at least 10, preferably of at least 100 and particularly preferably of at least 200. The aspect ratio is typically the ratio of the greatest dimension of the said conducting filler (such as, for example, the length of the conducting filler for carbon nanotubes) to the smallest dimension of the conducting filler (such as, for example, the diameter of the conducting filler for carbon nanotubes).

Use will preferably be made of carbon nanotubes as electrically conducting filler according to the invention. Carbon nanotubes exhibit the advantage of having a better compatibility with the polymer material, in comparison with the other types of conducting carbon-based fillers cited in the present invention.

"Nanotubes" is understood to mean nanoparticles of substantially elongated shape. Nanotubes conventionally have an "acicular" shape.

Carbon nanotubes can be of several types. They can be chosen from single-walled carbon nanotubes, double-walled carbon nanotubes, multi-walled carbon nanotubes and one of their mixtures. Use will preferably be made of multi-walled carbon nanotubes (MWNTs).

In a specific embodiment, the polymeric composition can comprise a sufficient amount of electrically conducting fillers to be able to obtain the properties desired in the shrinkable protective element.

More particularly, the amount of electrically conducting filler in the polymeric composition of the invention is in particular sufficient to be able to form a percolating network, when the shrinkable protective element is in the shrunken state.

More particularly, the amount of electrically conducting filler is sufficient for the shrinkable protective element of the invention to be able to accomplish a "dynamic" percolation transition, once the said element has shrunk, in particular by heat treatment.

"Dynamic percolation" is understood to mean an insulator/conductor transition (i.e. an increase of several orders of magnitude in the electrical conductivity associated with the mesoscopic scale by the formation and the growth of clusters of electrically conducting particles which tend to form an infinite cluster of inter-connected fillers) observed at constant filler content and resulting from a microstructural rearrangement of the composite by self-assembling of the electrically conducting fillers in the protective element shrunken using a heat treatment.

In addition, the amount of electrically conducting fillers in the polymeric composition according to the invention is in particular limited in order to be able to guarantee electrically insulating properties when the shrinkable protective element is in a nonshrunken state.

By way of example, the polymeric composition can comprise at most 30.0 parts by weight of electrically conducting fillers, preferably at most 10.0 parts by weight of electrically conducting fillers and particularly preferably at most 5.0 parts by weight of electrically conducting fillers, per 100 parts by weight of the polymer material. The polymeric composition can additionally comprise at least 0.1 parts by weight of electrically conducting fillers, per 100 parts by weight of polymer material.

When the electrically conducting filler of the invention is carbon nanotubes, the amount of the said filler can be at most 10.0 parts by weight of electrically conducting fillers, per 100 parts by weight of polymer material. This is because carbon nanotubes, which have a high aspect ratio (in particular an aspect ratio of at least 100), make it possible to achieve the percolation with relatively smaller amounts of conducting carbon-based fillers, in comparison with the other carbon-based fillers.

The Polymer Material

The polymer material of the invention can comprise one or more polymer(s), it being possible for the term "polymer" to mean any type of polymer well known to a person skilled in the art, such as homopolymer or copolymer (e.g. block copolymer, random copolymer, terpolymer, and the like).

The polymer can be of the thermoplastic or elastomer type and can be crosslinked by techniques well known to a person skilled in the art.

In a specific embodiment, the polymer material, or in other words the polymer matrix of the polymeric composition, can comprise one or more olefin polymers and/or one or more halogenated polymers.

Preferably, the polymer material of the invention can comprise one or more ethylene polymers and/or one or more propylene polymers. An olefin polymer is conventionally a polymer obtained from at least one olefin monomer.

More particularly, the polymer material comprises more than 50% by weight of olefin polymer(s), preferably more than 70% by weight of olefin polymer(s) and particularly preferably more than 90% by weight of olefin polymer(s) with respect to the total weight of polymer material. Preferably, the polymer material can be solely composed of one or more olefin polymer(s).

By way of example, the polymer material of the invention can comprise one or more olefin polymers chosen from a linear low density polyethylene (LLDPE); a very low density polyethylene (VLDPE); a low density polyethylene (LDPE); a medium density polyethylene (MDPE); a high density polyethylene (HDPE); an ethylene/propylene elastomer copolymer (EPR); an ethylene/propylene diene monomer terpolymer (EPDM); a copolymer of ethylene and vinyl ester, such as a copolymer of ethylene and vinyl acetate (EVA); a copolymer of ethylene and acrylate, such as a copolymer of ethylene and butyl acrylate (EBA) or a copolymer of ethylene and methyl acrylate (EMA); a copolymer of ethylene and alpha-olefin, such as a copolymer of ethylene and octene (PEO) or a copolymer of ethylene and butene (PEB); a functionalized olefin polymer; polypropylene; a propylene copolymer; and one of their blends.

It will be preferable to use an EVA with a content of vinyl acetate groups of at most 28% by weight and preferably of at most 20% by weight, in order to limit the presence of polar functional groups.

The polymer material of the invention can comprise one or more halogenated polymers, in particular chlorinated and/or fluorinated polymers. By way of example, mention may be made of polyvinylidene fluoride (PVDF), polytetrafluoroethylene (PTFE) or polychloroprene.

The polymeric composition of the invention can comprise at least 30% by weight of polymer material, preferably at least 50% by weight of polymer material, preferably at least 80% by weight of polymer material and preferably at least 90% by weight of polymer material, with respect to the total weight of the polymeric composition.

The Polymeric Composition

The polymeric composition of the invention can be a "noncrosslinkable" composition or a crosslinkable composition.

The polymeric composition of the invention can be a nonexpanded composition or a composition intended to be expanded. Expansion of a polymeric composition is well known to a person skilled in the art and can be carried out by a chemical expansion, for example by adding an endothermic or exothermic foaming agent to the composition, or a physical expansion, for example by adding a gas to the composition.

When the polymeric composition is said to be "noncrosslinkable", this means that the protective element, or more particularly the protective layer, obtained from this "noncrosslinkable" polymeric composition is a noncrosslinked element. "Noncrosslinked" is understood to mean an element for which the gel content, according to Standard ASTM D2765-01 (extraction with xylene), is at most 20%, preferably at most 10%, preferably at most 5% and particularly preferably 0%. In other words, the heat-shrinkable protective element, or more particularly the protective layer, is a thermoplastic or elastomeric element.

When the polymeric composition of the invention is said to be "crosslinkable", this means that the protective element, or more particularly the protective layer, obtained from this crosslinkable polymeric composition is a crosslinked element. The crosslinked element can be easily characterized by the determination of its gel content according to Standard ASTM D2765-01. More particularly, the crosslinked element can advantageously have a gel content, according to Standard ASTM D2765-01 (extraction with xylene), of at least 50%, preferably of at least 70%, preferably of at least 80% and particularly preferably of at least 90%.

The "crosslinkable" polymeric composition can thus be crosslinked by crosslinking processes well known to a person skilled in the art, such as, for example, peroxide crosslinking, crosslinking by an electron beam, silane crosslinking, crosslinking by ultraviolet radiation, and the like.

The crosslinkable polymeric composition can comprise a sufficient amount of one or more crosslinking agents, in order to obtain a crosslinked protective element. By way of example, the crosslinkable polymeric composition can comprise from 0.01 to 10.0% by weight of crosslinking agent, with respect to the total weight of the crosslinkable polymeric composition.

In a specific embodiment, the polymeric composition can advantageously be devoid of halogenated compounds.

Other Fillers

The polymeric composition of the invention can additionally comprise one or more other fillers different from the electrically conducting filler of the invention.

This other filler can be an inorganic or organic filler. It can be chosen from a flame-retardant filler and an inert filler (or noncombustible filler).

By way of example, the flame-retardant filler can be a hydrated filler chosen in particular from metal hydroxides, such as, for example, magnesium dihydroxide (MDH) or aluminum trihydroxide (ATH). These flame-retardant fillers act mainly by the physical route by decomposing endothermically (e.g., release of water), which has the consequence of limiting the propagation of the flames. The term flame-retardant properties is used in particular.

For its part, the inert filler can, for example, be chalk, talc or clay (e.g. kaolin).

The polymeric composition can comprise at least 1% by weight of other filler(s), preferably at least 10% by weight of other filler(s) and preferably at most 50% by weight of other filler(s), with respect to the total weight of the polymeric composition.

According to another characteristic of the invention and in order to guarantee a halogen-free shrinkable protective element, the said shrinkable protective element, or in other words the constituents which make up the shrinkable protective element, preferably does/do not comprise halogenated compounds. These halogenated compounds can be of any nature, such as, for example, fluoropolymers or chloropolymers, such as polyvinyl chloride (PVC), halogenated plasticizers, halogenated inorganic fillers, and the like.

In a preferred embodiment, the fillers which make up the polymeric composition of the invention are only one or more electrically conducting fillers as defined in the present invention.

The Additives

In addition, the polymeric composition of the invention can typically comprise additives in an amount of 0.01 to 20% by weight, with respect to the total weight of the polymeric composition.

The additives are well known to a person skilled in the art and can, for example, be chosen from:
  protective agents, such as antioxidants, UV stabilizers, agents for combating copper or agents for combating water treeing,
  processing aids, such as plasticizers, viscosity reducers or oils,
  compatibilizing agents,
  coupling agents,
  scorch retardants,
  pigments,
  cocrosslinking agents,
  crosslinking catalysts,
  and one of their mixtures.

More particularly, the antioxidants make it possible to protect the polymeric composition from the thermal stresses brought about during the stages of manufacture of the shrinkable protective element, of its positioning or of its operation.

The antioxidants are preferably chosen from:
  sterically hindered phenolic antioxidants, such as tetrakis [methylene(3,5-di(t-butyl)-4-hydroxyhydro-cinnamate)]methane, octadecyl 3-(3,5-di(t-butyl)-4-hydroxyphenyl)propionate, 2,2'-thiodiethylenebis[3-(3,5-di(t-butyl)-4-hydroxyphenyl)propionate], 2,2'-thiobis (6-(t-butyl)-4-methylphenol), 2,2'-methylenebis(6-(t-butyl)-4-methylphenol), 1,2-bis(3,5-di(t-butyl)-4-hydroxyhydrocinnamoyl)hydrazine and 2,2'-oxamidodiethyl bis[3-(3,5-di(t-butyl)-4-hydroxyphenyl)propionate];
  thioethers, such as 4,6-bis(octylthiomethyl)-o-cresol, bis [2-methyl-4-{3-(n-($C_{12}$ or $C_{14}$)alkylthio)-propionyloxy}-5-(t-butyl)phenyl]sulfide and thiobis[2-(t-butyl)-5-methyl-4,1-phenylene]bis[3-(dodecylthio) propionate];
  sulfur-based antioxidants, such as dioctadecyl 3,3'-thiodipropionate or didodecyl 3,3'-thiodipropionate;
  phosphorus-based antioxidants, such as phosphites or phosphonates, such as, for example, tris[2,4-di(t-butyl) phenyl]phosphite or bis[2,4-di(t-butyl)phenyl]pentaerythritol diphosphite; and
  amine-type antioxidants, such as phenylenediamines (IPPD, 6PPD, and the like), styrenated diphenylamines, diphenylamines, mercaptobenzimidazoles and polymerized 2,2,4-trimethyl-1,2-dihydroquinoline (TMQ), the latter type of antioxidant being particularly preferred in the composition of the invention.

The TMQs can have different grades, namely:
  a "standard" grade with a low degree of polymerization, that is to say with a residual monomer content of greater than 1% by weight and having a residual NaCl content which can range from 100 ppm to more than 800 ppm (parts per million by weight);
  a "high degree of polymerization" grade with a high degree of polymerization, that is to say with a residual monomer content of less than 1% by weight and having a residual NaCl content which can range from 100 ppm to more than 800 ppm;
  a "low content of residual salt" grade with a residual NaCl content of less than 100 ppm.

The type of stabilizing agent and its content in the polymeric composition of the invention are conventionally chosen according to the maximum temperature to which the polymers are subjected during the production of the mixture and during their processing, and also according to the maximum duration of exposure to this temperature.

The purpose of the crosslinking catalysts is to help in the crosslinking. The crosslinking catalyst can be chosen from Lewis acids, Brönsted acids and tin-based catalysts, such as, for example, dibutyltin dilaurate (DBTL).

The Shrinkable Protective Element

In the present invention, the shrinkable protective element has a shape memory and a function memory, once the polymeric composition has been hot drawn and cooled.

More particularly, the shape memory makes it possible for the shrinkable element to recover the dimensions desired with respect to the application (such as, for example, to match the diameter of the cable to be protected) after the heat treatment. The function memory makes it possible for the shrinkable element to guarantee electrical conduction properties after heat treatment.

The shrinkable protective element of the invention (i.e., element before it has been shrunk) and in particular the protective layer of the invention (i.e., layer before it has been shrunk) is more particularly an electrically insulating element. "Electrically insulating" is understood to mean an element, or more particularly a layer, the electrical conductivity of which can be at most $1.10^{-8}$ S/m (siemens per meter) and preferably strictly less than $1.10^{-8}$ S/m, measured at 25° C. in direct current.

In the present invention, the shrunken protective element (i.e., shrinkable element which has been shrunk) and in particular the protective layer of the invention (i.e., layer which has been shrunk) is more particularly a semiconducting element. "Semiconducting" is understood to mean an element, or more particularly a layer, the electrical conductivity of which can be at least $1.10^{-8}$ S/m (siemens per meter), preferably strictly greater than $1.10^{-8}$ S/m, preferably at least $1.10^{-3}$ S/m, and preferably can be less than $1.10^{3}$ S/m, measured at 25° C. in direct current.

In a specific embodiment, the electrical conductivity of the polymeric composition is less than the electrical conductivity of the protective layer. The electrical conductivity of the polymeric composition can be at least 10 times less than the electrical conductivity of the protective layer, preferably at least 100 times less than the electrical conductivity of the protective layer and particularly preferably at least 1000 times less than the electrical conductivity of the protective layer.

In a preferred embodiment, the heat-shrinkable protective element is a tubular element which shrinks in the radial direction with respect to the longitudinal axis of a cable when it is subjected to a heat treatment. The tubular element can be a sheath or a sleeve.

Typically, the volume of the material constituting the tubular element remains constant between the shrinkable or nonshrunken state and the shrunken state: the thickness of the shrunken tubular element is thus greater than the thickness of the nonshrunken tubular element.

The degree of shrinkage of the tubular element can be between 100 and 600%, the degree of shrinkage being the ratio of the internal diameter of the tubular element in the nonshrunken state to the internal diameter of the tubular element in the shrunken state (obtained after heat treatment).

The shrinkable protective element of the invention can comprise one or more protective layers in accordance with the invention.

Preferably, the combined layers which constitute the heat-shrinkable protective element are heat-shrinkable layers.

In a specific embodiment, the shrinkable protective element of the invention comprises at least one heat-shrinkable protective layer in accordance with the invention and at least one heat-shrinkable layer different from the protective layer in accordance with the invention.

More particularly, the heat-shrinkable layer different from the protective layer in accordance with the invention can be an electrically insulating layer which will remain electrically insulating in its shrunken state (after heat treatment).

By way of example, the heat-shrinkable protective element comprises a first protective layer in accordance with the invention covering a second layer different from the first layer. In the nonshrunken state (before heat treatment), the first layer and the second layer are both electrically insulating layers. In the shrunken state (after heat treatment), the first (protective) layer becomes semiconducting and the second layer remains electrically insulating.

Another subject-matter of the invention is a process for the manufacture of a heat-shrinkable protective element according to the invention, characterized in that it comprises the following stages:

i. hot drawing the polymeric composition; and ii. cooling, in its drawn state, the polymeric composition drawn in stage i, in particular at ambient temperature (e.g., in the vicinity of 25° C.).

Preferably, the polymeric composition is in the form of a tubular element, such as, for example, a sheath or a sleeve. For example, the polymeric composition before stage i has been shaped by extrusion in order to form the said tubular element.

The hot drawing stage i makes it possible to be able to form a shrinkable element with dimensions allowing it to be able to be easily positioned around an electric cable. The final degree of shrinkage is thus a function of stage i.

For example, when the shrinkable protective element is in the form of a sleeve intended to be positioned around an electric cable, the internal diameter of the shrinkable sleeve has to be greater than the external diameter of the cable in order to be able to easily install the said shrinkable sleeve around the said electric cable. The shrinkable sleeve is subsequently shrunk by heat treatment in a way sufficient to be able to have an internal diameter substantially identical to the external diameter of the electric cable.

The hot drawing stage i is a stage carried out by mechanical drawing of the polymeric composition, for example by expansion under vacuum while passing into a tubular oven under negative pressure with respect to the center of the crosslinked tube. Once expanded, the tube is cut up into unit lengths of sleeve type.

The drawing of the polymeric composition is limited by the maximum elongation which the polymeric composition can withstand, namely its mechanical failure.

The hot drawing of the polymeric composition is carried out at a temperature sufficient to render the polymeric composition malleable, without, however, thermally decomposing the said composition.

More particularly, the heat treatment stage i can be carried out above the melting point of the polymeric composition, when the polymer material is crystalline or semicrystalline, and above the glass transition temperature of the polymeric composition, when the polymer material is amorphous.

In the present invention, the melting point or glass transition temperature of the polymer material is conventionally measured respectively at the melting peak or at the observation of a shoulder on a thermogram obtained by differential scanning calorimetry (DSC) with a temperature gradient of 10° C./min under a nitrogen atmosphere.

Another subject-matter of the invention is a cable, in particular an electric cable, comprising a shrunken protective element obtained from the heat-shrinkable protective element of the invention.

More particularly, the shrunken protective element is in the tubular form, for example of the sheath or sleeve type.

Preferably, the shrunken protective element substantially matches the shapes of the element which it covers. The protective layer of the shrunken protective element can advantageously be a semiconducting layer which can in particular be obtained from the protective layer of the heat-shrinkable protective element.

In a specific embodiment, the shrunken protective element is the heatshrink mentioned above, in its shrunken state.

The shrunken protective element can be a cable fitting, the said fitting thus surrounding the cable. The fitting can in particular be a cable joint or termination. The semiconducting properties of the shrunken protective element advantageously make it possible to be able to control the geometry of the electric field when the electric cable is under voltage.

Another subject-matter of the invention is a process for the manufacture of a cable comprising a shrunken protective element, characterized in that it comprises the following stages:

a. positioning the shrinkable protective element around a cable, and b. heat treating the shrinkable protective element positioned in stage a in order to form the said shrunken protective element.

Typically, stage b makes it possible for the protective element drawn in stage i to be able to be shrunk and in particular to be able to recover the initial elongation which it had before stage i.

The temperature of the heat treatment at stage b can be chosen so that the relaxation of the mechanical stresses on the polymer chains—responsible for the shrinking of the system—and the dynamic percolation are rendered possible. The temperature at stage b must not exceed a limiting value from which thermal decomposition of the material might occur.

The cable described in the invention is preferably an electric cable comprising an elongated electrical conductor, in particular in the central position, surrounded by at least one electrically insulating layer, conventially obtained by extrusion. The elongated electrical conductor can be a metal wire or a plurality of metal wires, which is/are or is/are not twisted, in particular made of copper and/or of aluminum, or one of their alloys.

In a first embodiment, the electric cable can be a low-voltage cable comprising solely an electrically insulating layer or else comprising an electrically insulating layer surrounded by a semiconducting layer.

In a second embodiment, the electric cable can be a medium-voltage or high-voltage cable. This type of electric cable typically comprises a central elongated electrical conductor surrounded by a first semiconducting layer, this first semiconducting layer being surrounded by an electrically insulating layer, this electrically insulating layer being surrounded by a second semiconducting layer. The term used is then a "three-layer" insulation. In addition, the electric cable can comprise an earthing and/or protective metal shield surrounding the second semiconducting layer and the said metal shield can be surrounded by an external protective sheath, in particular made of polymer.

BRIEF DESCRIPTION OF THE DRAWINGS

Other characteristics and advantages of the present invention will become apparent in the light of the examples which follow with reference to the annotated figures, the said examples and figures being given by way of illustration and without in any way being limiting.

For reasons of clarity, only the elements essential for the understanding of the invention have been represented diagrammatically, this being done without respecting the scale.

DETAILED DESCRIPTION

Figure 1:
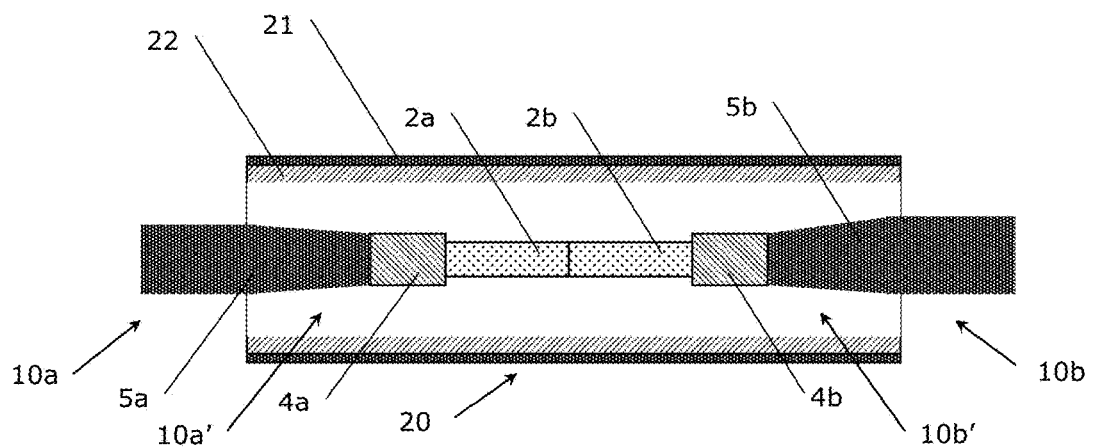
FIG. 1 represents a diagrammatic view of a heat-shrinkable protective element according to the invention, positioned around electric cables, before and after heat treatment.
Figure 1:
Figure 1:
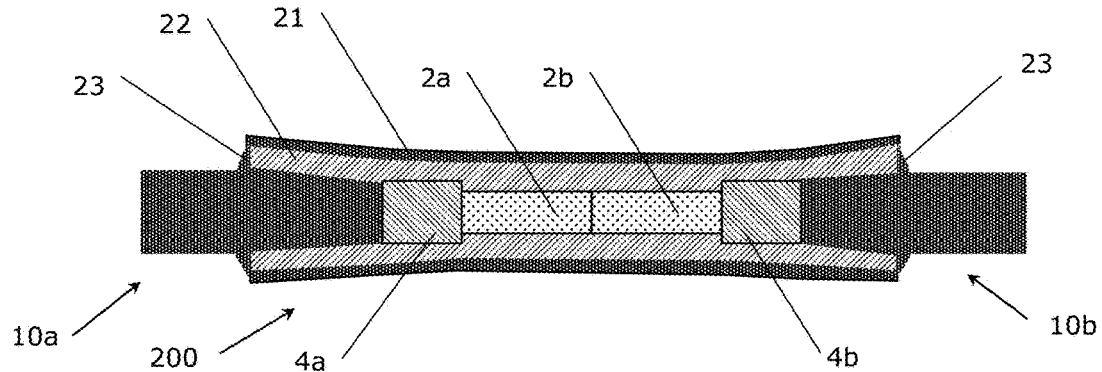

FIG. 1 represents a diagrammatic view of a heat-shrinkable protective element 20 according to the invention, positioned around electric cables 10a and 10b, before heat treatment (part "a" of FIG. 1) and after heat treatment (part "b" of FIG. 1). The shrinkable protective element 20 is more particularly here a joint surrounding the ends 10'a and 10'b of the two electric cables 10a and 10b. This joint makes it possible to electrically connect the first cable 10a to the second cable 10b.

The shrinkable protective element 20 comprises a first protective layer 21 according to the invention and a second layer 22 different from the first layer, the first layer 21 surrounding the second layer 22.

In the nonshrunken state (a) (before heat treatment) the first layer and the second layer of the shrinkable protective element 20 are both electrically insulating layers.

When the protective element is shrunk (i.e., shrunken protective element 200) by heat treatment (b), the first protective layer 21 becomes a semiconducting layer and the second layer 22 remains electrically insulating.

In addition, the shrunken protective element 200 substantially matches the shapes of the parts of the electric cables 10a and 10b which it covers.

The first cable 10a and the second cable 10b represented diagrammatically in FIG. 1 respectively comprise an elongated electrical conductor 2a, 2b surrounded by a first semiconducting layer (not represented), an electrically insulating layer 4a, 4b surrounding the first semiconducting layer 3a, 3b and a second semiconducting layer 5a, 5b surrounding the electrically insulating layer 4a, 4b.

Typically, at the said end 10'a, 10'b of each electric cable 10a, 10b, the second semiconducting layer 5a, 5b is at least partially stripped in order for the electrically insulating layer 4a, 4b to be at least partially positioned inside the protective element 20, 200, without being covered by the second semiconducting layer 5a, 5b of the electric cable.

Conventionally, the electric cables 10a and 10b can be connected to one another by virtue of an electrical connector (not represented).

Finally, the ends of the shrunken protective element 200 can be respectively surrounded by a semiconducting tape 23. Thus, the first protective layer 21 and the second semiconducting layers 5a and 5b are in physical contact via the said semiconducting tape 23.

Of course, the embodiment described in FIG. 1 is not limiting. In another embodiment, the shrinkable protective element 20 can comprise only the first protective layer 21 according to the invention: the shrinkable protective element 20 is thus the protective layer 21 in accordance with the invention. For this reason, the first protective layer 21 of the shrunken protective element 200 substantially matches the shapes of the parts of the electric cables 10a and 10b which it covers. The first protective layer 21 is thus in direct physical contact with the second semiconducting layers 5a and 5b of the electric cables 10a and 10b. In this case, it is not necessary to position the said semiconducting tapes 23.

EXAMPLES

1. Polymeric Composition According to the Invention

A polymeric composition I1 according to the invention, the amounts of the compounds of which are expressed in parts by weight per 100 parts by weight of polymer material, is described in Table 1 below.

The polymer material in Table 1 is composed solely of EVA.

TABLE 1

| Polymeric composition | I1 |
|---|---|
| Polymer material | 100 |
| Electrically conducting filler | 5.3 |

The origin of the compounds of Table 1 is as follows:
Polymer material is a random copolymer of ethylene and vinyl acetate (EVA) having a melting point of 96° C., sold by ExxonMobil Chemical under the reference Escorene Ultra EVA UL00112, having 12% by weight of vinyl acetate groups; and
Electrically conducting filler is multi-walled carbon nanotubes, sold by Arkema under the reference Graphistrength C100, having:
  a BET specific surface of approximately 250 m$^2$/g according to Standard ASTM D 6556,
  a mean external diameter of 10 to 15 nanometers, measured by TEM,
  a length of 0.1 to 10 micrometers, measured by TEM, and
  an aspect ratio of the order of 100 to 1000.

2. Preparation of the Heat-Shrinkable Protective Element

The polymeric composition I1 according to Table 1 is processed as follows.

The polymer material is introduced into an internal mixer at a temperature of 110° C. The carbon nanotubes are added after complete melting of the polymer matrix. The composite obtained after homogenizing for 5 minutes is subsequently passed over a roll mill in order to optimize the dispersion and the distribution of the nanoparticles. The composite can furthermore be obtained by single-screw or also twin-screw extrusion.

The composite is finally processed in the form of plaques with a thickness of 1 mm by hot compression at 130° C. for 10 minutes.

Figure 2:
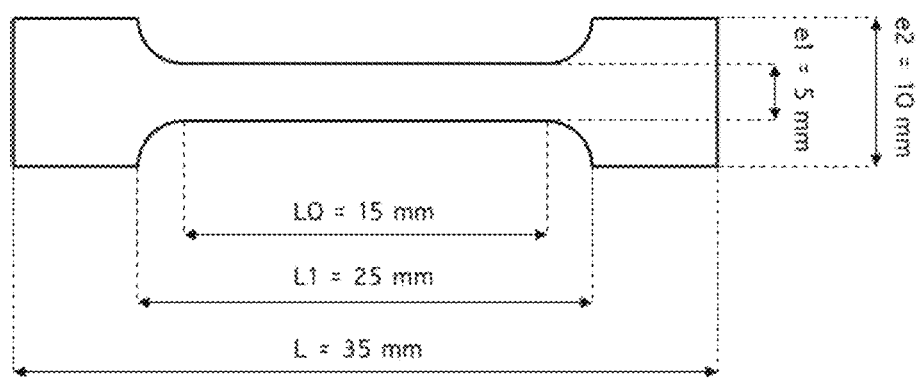
FIG. 2 represents a diagrammatic view of a model test specimen for determining the electrical conductivity of a polymeric composition according to the invention as a function of the stages of manufacture of a heat-shrinkable protective element according to the invention.

H1-type test specimens with the shape and dimensions shown in FIG. 2 are cut out using a hollow punch, the test specimens having a thickness of 1 mm. The initial elongation LO of the test specimen (before it is drawn) is 15 mm.

These test specimens will be used to evaluate the electrical properties of the polymeric composition of the invention and thus, by extension, the electrical properties of the heat-shrinkable protective element, during its manufacture.

The test specimen will be prepared as follows.

In a first stage i, the test specimen is drawn by 15 mm by virtue of a tensile testing device, under a temperature of 85° C. in a conditioning chamber: the elongation of the test specimen then becomes equal to 30 mm.

As the composite of this example is not crosslinked (i.e., polymeric composition I1), the hot elongation under stress is carried out at 85° C. At this temperature, the material is softened but does not flow since the crystalline phase is not completely molten.

More particularly, the heat treatment stage in i is carried out in an Adamel-Lhomargy conditioning chamber operated using a Eurotherm 808 temperature controller.

The hot drawing stage in i is carried out using an Adamel-Lhomargy DY 32 tensile testing device (coupled to the conditioning chamber) with a pull rate of 3 mm/minute, the maximum elongation supported by the tensile testing device being 20 mm.

Subsequently, in a second stage ii, the test specimen drawn in i is cooled to 25° C. over 60 minutes, in its drawn state.

More particularly, stage ii is carried out in the drawn state of the test specimen in stage i, or in other words under the conditions of mechanical stresses of stage i. In order to do this, the test specimen remains placed between the jaws. In addition, the conditioning chamber of the tensile testing device is removed in order to be able to cool the test specimen to ambient temperature (25° C.).

3. Shrinking of the Heat-Shrinkable Protective Element

The test specimen cooled in stage ii is subsequently heat treated in order for it to be shrunk into its initial elongation LO of 15 mm, the initial elongation which it had before stage i.

This heat treatment is carried out for 10 minutes using a hot air gun (or paint burner) employed at its maximum power. The temperature obtained at the surface of the protective element by virtue of this heat treatment is greater than the melting point of the EVA making up the polymeric composition of Example I1; namely, it is of the order of 200° C.

4. Results

The measurements of electrical conductivity at different stages of the manufacture of the test specimen, and also its elongation measurements, are collated in Table 2 below.

The electrical conductivity is measured conventionally via the electrical resistance of the test specimen, according to the formula $R = \rho \cdot e / S$, in which:
  R=Measured resistance of the material ($\Omega$),
  e=Distance between the two measurement points (m),
  S=Cross section of the test specimen between the two measurement points (m$^2$),
  $\rho$=Resistivity of the material, which is a function of the electrical conductivity $\sigma$ according to the well-established formula $\sigma = 1/\rho$ ($\sigma$ is expressed in siemens per meter $S \cdot m^{-1}$ or in $(\Omega \cdot m)^{-1}$).

In the present invention, the electrical conductivity is measured according to Standard ISO 3915, in direct current and at 25° C., using a sourcemeter (source of current and voltage measurement) sold under the tradename 2611A by Keithley.

The elongation is measured using a caliper.

TABLE 2

| Test specimen produced from the polymeric composition I1 | Elongation of the test specimen, in mm | Electrical conductivity of the test specimen, in $S \cdot m^{-1}$ |
|---|---|---|
| Initial stage (before stage i) | 15 | $<1 \cdot 10^{-8}$ |
| After the heat treatment in stage i | 30 | $<1 \cdot 10^{-8}$ |
| After the cooling of stage ii | 30 | $<1 \cdot 10^{-8}$ |
| After the stage of shrinking by heat treatment | 15 | approximately $1 \cdot 10^{-1}$ |

The invention claimed is:
1. Heat-shrinkable protective element comprising:
  at least one protective layer obtained from a polymeric composition having a polymer material, wherein the polymeric composition additionally has an electrically conducting filler having a BET specific surface of at least 100 m$^2$/g according to Standard ASTM D 6556 (2014), and wherein the protective layer is electrically insulating with an electrical conductivity of at most $1.10^{-8}$ S/m, measured at 25° C. in direct current, and wherein the protective layer becomes a semiconducting element with an electrical conductivity greater than $1.10^{-8}$ S/m once shrunk.

2. Protective element according to claim 1, wherein the electrically conducting filler has an aspect ratio of at least 10.

3. Protective element according to claim 1, wherein the electrically conductive filler has an aspect ratio of at least 100.

4. Protective element according to claim 1, wherein the electrically conducting filler is a carbon-based filler.

5. Protective element according to claim 1, wherein the electrically conducting filler is selected from the group consisting of carbon blacks, carbon fibers, graphites, graphenes, fullerenes, carbon nanotubes and one of their mixtures.

6. Protective element according to claim 1, wherein the polymeric composition has at most 30.0 parts by weight of electrically conducting filler and preferably at most 10.0 parts by weight of electrically conducting filler, per 100 parts by weight of polymer material.

7. Protective element according to claim 1, wherein the polymer material has at least one olefin polymer.

8. Protective element according to claim 7, wherein the olefin polymer is a copolymer of ethylene and vinyl acetate (EVA).

9. Protective element according to claim 1, wherein said protective element is shrinkable and wherein the protective layer is noncrosslinked.

10. Shrunken protective element obtained from the protective element according to claim 1, wherein the protective layer is semiconducting in the shrunken state with an electrical conductivity greater than $1.10^{-3}$ S/m, measured at 25° C. in direct current.

11. Process for the manufacture of a protective element according to claim 1, said protective element being heat-shrinkable, said process comprising the steps of:
   i. hot drawing the polymeric composition; and
   ii. cooling, in its drawn state, the polymeric composition drawn in stage i.

12. Cable comprising:
   a shrunken protective element obtained from a protective element, that is heat shrinkable, defined according to claim 1.

13. Cable according to claim 12, wherein the protective layer is a semiconducting layer.

14. Process for the manufacture of a cable comprising:
   a shrunken protective element according to claim 12, said method comprising the steps of:
   a. positioning the protective element that is heat shrinkable around a cable, and
   b. heat treating the protective element positioned in stage a in order to form the shrunken protective element.

* * * * *